April 21, 1942. R. C. NEWMAN ET AL Re. 22,078

SLIVER FORMATION

Original Filed Aug. 25, 1937 3 Sheets-Sheet 1

INVENTORS
RALPH C. NEWMAN
AND JOHN W. ROMIG
By Dorsey Colt & Garner
ATTORNEYS.

SLIVER FORMATION

Original Filed Aug. 25, 1937 3 Sheets-Sheet 2

INVENTORS
RALPH C. NEWMAN
AND JOHN W. ROMIG
BY Dorsey, Colvin & Garner
ATTORNEYS.

SLIVER FORMATION

Original Filed Aug. 25, 1937 3 Sheets-Sheet 3

INVENTORS.
RALPH C. NEWMAN
AND JOHN W. ROMIG
BY Dorsey, Cole & Garner
ATTORNEYS.

Reissued Apr. 21, 1942 Re. 22,078

UNITED STATES PATENT OFFICE 22,078

SLIVER FORMATION

Ralph C. Newman, Corning, N. Y., and John W. Romig, Rumford, R. I., assignors, by mesne assignments, to Owens-Corning Fiberglas Corporation, a corporation of Delaware Original No. 2,202,118, dated May 28, 1940, Serial No. 160,908, August 25, 1937. Application for reissue May 27, 1941, Serial No. 395,472

40 Claims. (Cl. 57—5)

This invention relates to the formation and fabrication of fibres and fibrous materials.

Heretofore, the preparation of yarns, rovings, and similar articles has involved a large number of manipulations of the basic fibres. This included various processes by which the fibres were separated, arranged in parallel relationship, formed into sliver, drafted, and twisted into yarn or thread. In the case of insulated coverings for wire it was often necessary to perform all of these operations and then braid or otherwise apply the finished yarn about the conductor.

The object of this invention is to fabricate bulk fibrous materials into various desired articles such as yarns, rovings, and insulation coverings and the like of superior quality and physical characteristics and with a minimum amount of manipulation of the material, eliminating many of the conventional processing operations.

The principal feature of this invention is a process wherein raw materials are subdivided into separate fibres which are immediately gathered together into a body of annular configuration and then spun into any one of a number of desired forms.

In the accompanying drawings are disclosed a number of structures capable of carrying out this process in its basic form and with numerous variations.

Figure 5:
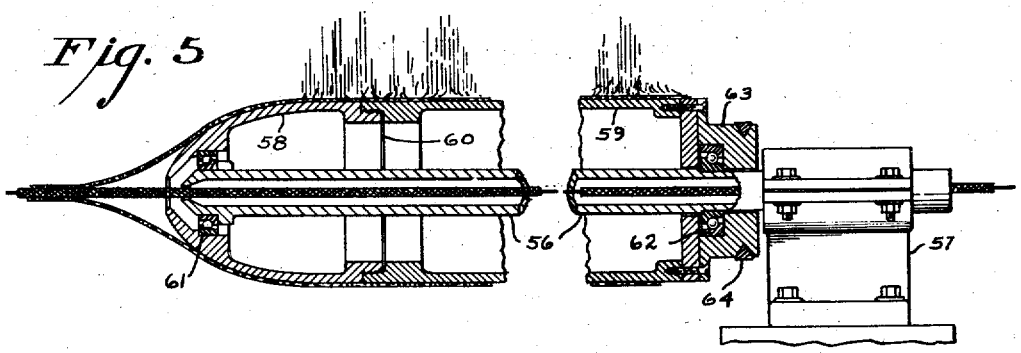
Fig. 5 is an elevation, partially in section, of a spinning mandrel of somewhat different design especially adapted for cable manufacture.
Figure 6:
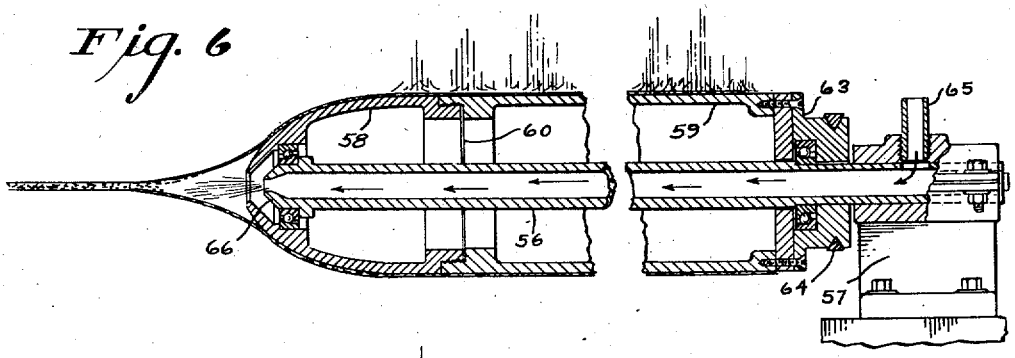
Figure 7:
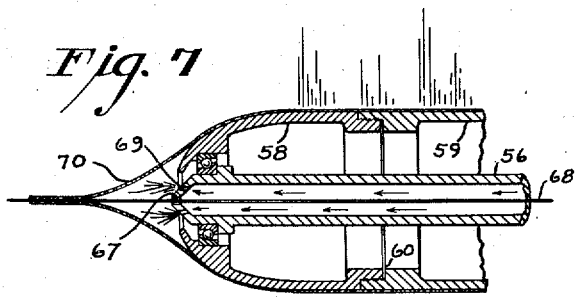
Figure 8:
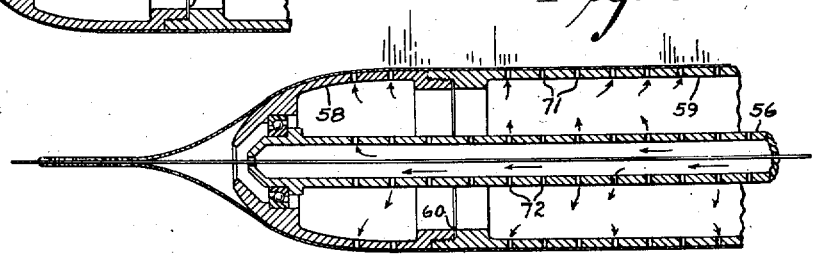
Figure 9:
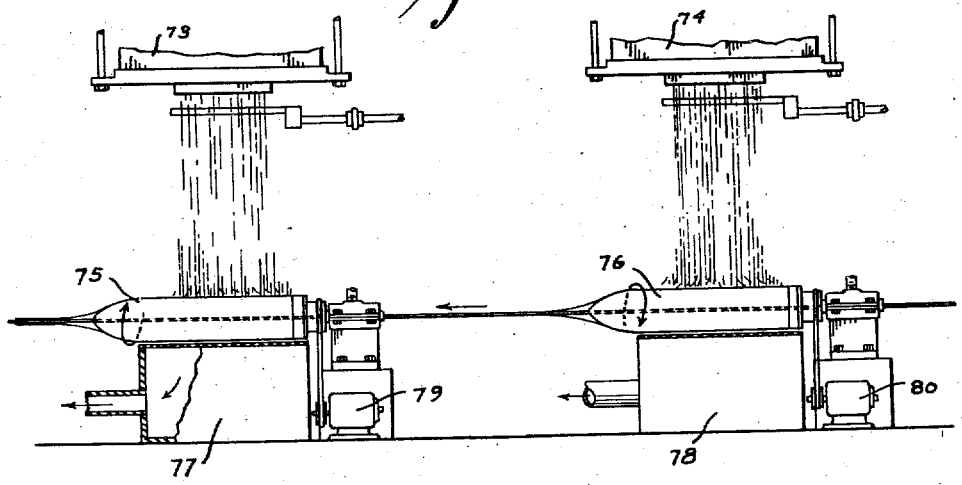
Figure 10:
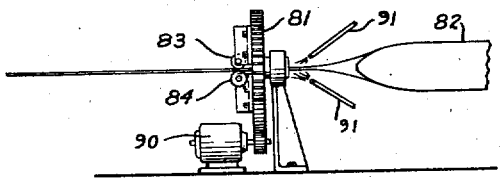
Figure 11:
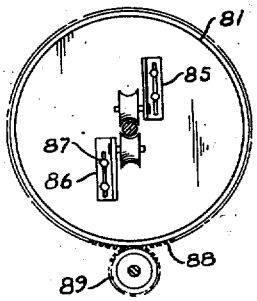

Figs. 6, 7, and 8 are sectional views of the mandrel of Fig. 5 modified to provide for application of various treating fluids to the fibrous materials being fabricated;

Fig. 9 is an elevation showing a pair of spinning mandrels arranged in series. As illustrated, the device is spinning a pair of oppositely twisted layers of insulation upon a conductor;

Fig. 10 is an elevation showing a compacting device cooperating with the spinning device to produce products of uniform diameter; and Fig. 11 is an elevation showing the structural details of the mounting of the compacting rollers.

While this process has many advantages when performed in conjunction with the processing of natural fibres such as cotton, silk, and wool, and with the cellulose compounds commonly known as artificial silk, it is in conjunction with the formation and use of fine filaments of thermoplastic substances such as glass, resins, and the like that it finds its broadest applications.

The structure disclosed in detail is particularly designed to produce filaments of glass, commonly known as glass wool, although this structure may be operated with equal efficiency in the production of fibres of any other thermoplastic substance normally solid at moderate temperatures. In this device the thermoplastic substance is melted electrically and divided mechanically into fine streams, which are in turn drawn into filaments of exceedingly fine diameter, for instance, by a jet of gas issuing at high speed from a blower surrounding the streams. It has been found possible to collect the fine fibres immediately after their production on a rotating body. In the accompanying drawings, the rotating body is disclosed as a generally cylindrical mandrel placed in the path of the fibres with its axis of rotation at right angles to the path of the newly formed fibres which are directed adjacent to its surface by a draft of air being drawn into an adjacent vacuum chest. As the fibres are deposited on this body in a heterogeneous, interlaced manner, layer on layer, a mass of fibres is built up about the surface of the mandrel.

If the fibres constituting the edge of the felted mass are gathered together and drawn off over the end of the mandrel, it will be found that they will in turn pull adjacent fibres with them and thus apply a tractive effort which promotes gradual movement of the entire mass toward the end of the mandrel. If the rate of lineal movement of the withdrawn fibres is properly regulated with respect to the rate at which additional fibres are being deposited on the mandrel, the mass will remain substantially constant as to area and volume, fibres being withdrawn and the mass being replenished continuously over an indefinite period.

In withdrawing fibres from the mass, it has been found advisable to move the fibres in a straight line along the axis of rotation of the mandrel for an appreciable distance after which they may be diverted as desired. No rotation is imparted to the withdrawn fibres so the continuous rotation of the mandrel will produce relative rotation betwen the withdrawn fibres and the mass from which they are withdrawn. Thus what would otherwise be a cylinder of interlaced fibres of the same diameter as the mandrel is spun down into a twisted yarn whose weight and degree of twist are determined by the rate of production of the fibres, the speed of draw and the speed of rotation of the mandrel. However, on examination of the resulting yarn it will be found to retain an essentially tubular construction.

The fibre forming device and winding mechanism which are shown in the drawings are of standard manufacture and no claim is laid to the mechanical details of these structures save in combination with the novel collecting and spinning mechanism. This mechanism consists essentially of a hollow mandrel, suitable means for driving this mandrel at various speeds, and suction means to aid in the collection of fibres about the surface of the mandrel. In general it has been found that a single suction chest placed beneath the mandrel and having a perforate upper surface closely adjacent thereto is ample to effect collection of the fibres as desired. Such a suction chest draws a considerable volume of air about the mandrel and the fibres, borne in this body of air, are brought into close proximity to the mandrel. It has been found that the fibres will collect in a uniform felted mass about the mandrel without any mechanical means attracting them thereto, but it is advantageous in certain instances to perforate the surface of the mandrel and evacuate its interior, thereby drawing the fibres down into contact therewith. However, this may result in the fibres wrapping so tightly about the mandrel that they are not easily withdrawn. Since the mandrel rotates at a considerable speed there is a tendency for the fibres to pull away therefrom under the influence of centrifugal force. It has been found possible to control the cohesion between the mandrel and fibres by placing a baffle plate within the mandrel which limits the application of suction to a portion only of the surface of the mandrel. By adjustment of this baffle longitudinally of the mandrel the area to which suction is applied may be increased or decreased while angular adjustment about the axis of the mandrel permits adjustment of the suction area with respect to the descending stream of fibres and may be used to secure uniform deposition of the fibres on the mandrel.

Since a yarn of generally tubular construction is produced by this method of spinning, the process naturally suggests itself as a means for producing insulating coverings on electrical conductors. To accomplish this a passageway through the rotating mandrel is provided preferably in the form of a hollow shaft extending therethrough. This shaft may rotate with the mandrel but where conductors of considerable size are to be covered, especially cables, it is preferable to mount the shaft in fixed position and rotate the mandrel thereon. In either of these arrangements an opening is provided in the nose of the mandrel, which nose may be removable and varied as to contour according to the type of product which is desired.

The hollow shaft passing through the mandrel is not only useful as a guide for the conductor which is to be covered, but may advantageously constitute a conduit for the application of various treating substances such as lubricants, sizes, and impregnants to the fibres as they are spun from the end of the mandrel. In spinning down the felted cylinder of fibres to a yarn or conductor covering, a cone of interlaced fibres is formed adjacent the nose of the mandrel. By attaching a spray nozzle or similar means to the end of the hollow shaft, treating substances may be sprayed on the interior of this cone of fibres resulting in a very thorough application of the substances to the fibres with a minimum of waste, such loss as occurs taking place only by passage of the substance through the cone of interlaced fibres. By the provision of a special head which has both nozzle and guide openings, it is possible to spray impregnants and adhesives between the cone of interlaced fibres and a conductor producing an impregnated covering on a conductor in a single operation.

A still further use may be made of the hollow shaft. By providing perforations along its length and along the surface of the mandrel, it has been found possible to apply mixtures of oil and similar treating substances to the fibres as they are deposited on the surface of the mandrel thus eliminating the necessity of an open spray adjacent the blower.

When certain treating substances, notably sizes and impregnants, are applied to the fibres, it is often advisable to compact the yarn or conductor covering so as to render it solid and of uniform diameter. This may be accomplished by various mechanical devices such as dyes, burnishing plates, and the like, but the drawings illustrate a structure in which the yarn or conductor passes through a pair of grooved rollers shortly after it has been sprayed with the treating substances. The configuration of these rollers and their setting determine the extent to which the fibres are compacted. If the rollers are moved circumferentially about the conductor as it is drawn therethrough, a wiping action takes place which produces a superior finish on the product. The movement given to the rollers should be so chosen as to correspond generally to the direction in which the fibres lie in the surface of the yarn or conductor covering.

It will, of course, be obvious to those acquainted with the manufacture of insulated wire and cable that a battery of these spinning mandrels may be set up to operate one after another on a single conductor, spinning a series of concentric coverings thereon. In such an arrangement adjacent mandrels are rotated in opposite directions to produce opposite twists in adjacent layers. This same arrangement of equipment may be used to produce a novel yarn. If the conductor be omitted and the yarn from one mandrel run through a second, rotating in the opposite direction, a yarn will be produced having a core twisted in one direction and a seamless outer layer twisted in the other direction. Since these two twists oppose each other, the yarn has no tendency to twist on itself and kink.

Figure 1:
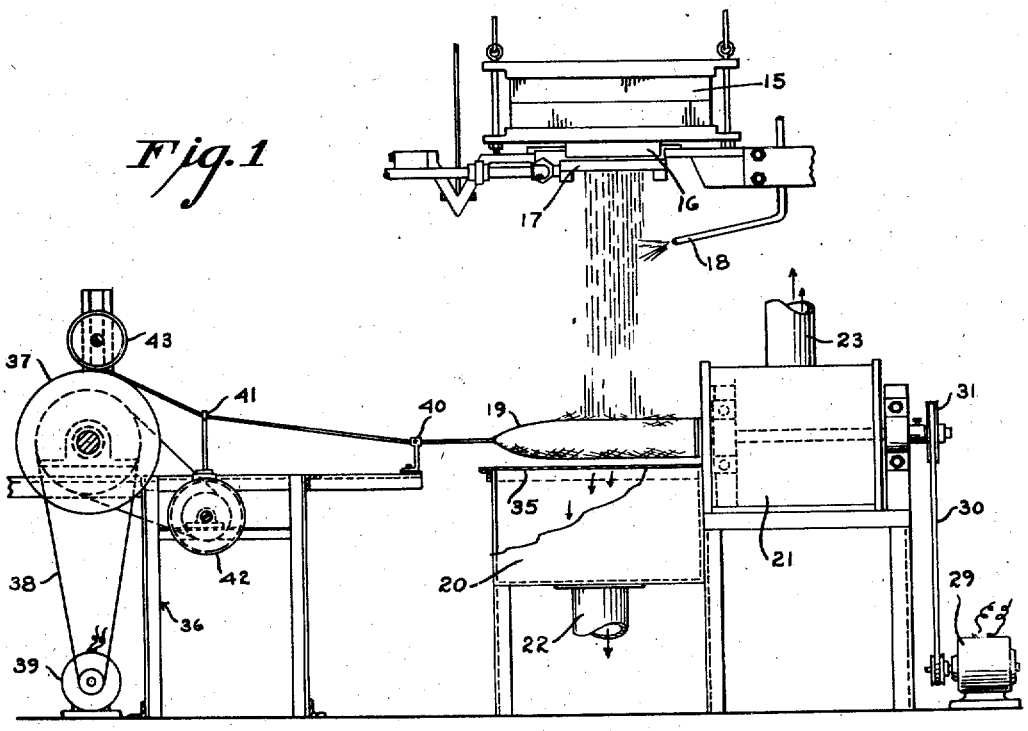
Fig. 1 is a vertical elevation of the assembled device including a fibre forming unit, a spinning mandrel, and a takeoff mechanism.

Referring in more detail to the specific structure disclosed in this application, it will be seen that there is disclosed diagrammatically in Fig. 1 a fibre forming mechanism such as is shown in detail in the British patent to Triggs No. 428,720, dated May 17, 1935. In such a structure the thermoplastic material from which the fibres are to be formed is melted in a refractory container 15 and issues from the bottom thereof through openings in an electrically heated bushing plate 16. The issuing streams of thermoplastic material are cooled and attenuated to filaments of minute diameter by the action of a jet of gas issuing at high velocity from a blower 17 of suitable design located immediately below the bushing. As these filaments pass downwardly from the blower they may be sprayed with a suitable conditioning fluid issuing from the pipe 18.

Figure 2:
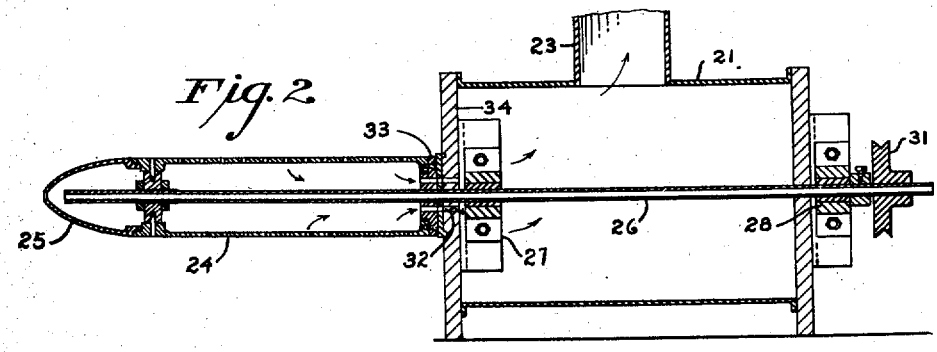
Fig. 2 is a vertical section through the spinning mandrel of Fig. 1.

Directly beneath the bushing is positioned a spinning unit which consists of a rotatable hollow mandrel 19 and associated vacuum chests 20 and 21 which are connected with a suitable suction device by ducts 22 and 23. As shown in more detail in Fig. 2, the mandrel 19 consists of a perforate cylindrical metal shell 24 and tapered head 25 mounted upon the shaft 26. This shaft is journaled in bearings 27 and 28 and may be rotated at any desired speed by the variable speed electric motor 29 operating through belt 30 and pulley 31. A series of registering holes 32 in the end plate 33 of the mandrel and the adjacent wall 34 of the vacuum chest 21 permit partial evacuation of the mandrel.

As the newly formed fibres pass downwardly from the blower they are caught in the current of air being drawn into the vacuum chest 20 through its upper surface 35 which may be made of wire mesh or other perforate material. This vacuum chest is so positioned and shaped with respect to its surface 35 that it directs the fibres about the rapidly rotating mandrel where they are deposited and formed into a sheath-like layer. This layer is continuously withdrawn from the end of the mandrel by the adjacent winding mechanism designated generally at 36. This Mechanism may be of any desired type but as shown consists of a friction drum 37 driven by belt 38 at the desired speed by a variable speed motor 39. The withdrawn fibres are spun down into a yarn or conductor covering adjacent the nose of the mandrel which passes through a fixed guide 40, located in axial alignment therewith, and the eye 41 of a conventional traverse mechanism 42. The finished material is wound about the cylinder 43 due to frictional contact with drum 37.

Figure 3:
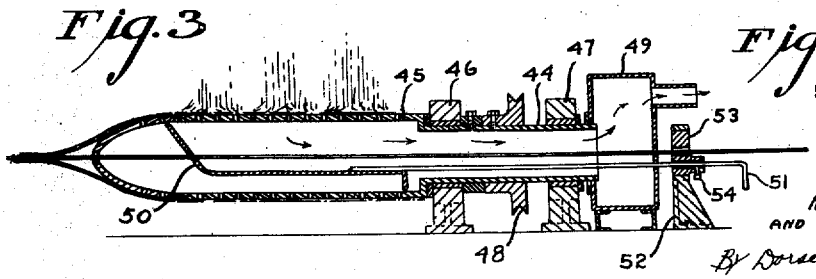
Fig. 3 is a section through a spinning mandrel mounted in a somewhat different manner and including an adjustable control baffle.
Figure 4:
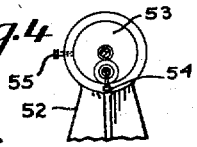
Fig. 4 is an elevation showing details of the baffle mounting and adjusting mechanism of Fig. 3.

While it has been found that the descending fibres will wrap themselves about the mandrel in a satisfactory manner solely under the action of the vacuum chest 20, it has been found desirable, in certain instances, to at least partially offset the centrifugal force acting on the fibres due to the high speed of rotation of the mandrel. This may be accomplished by developing a partial vacuum in the mandrel through communication with the vacuum chest 21 in the manner described above or by a somewhat different mounting for the mandrel as shown in Fig. 3. In this structure the central shaft is eliminated and an extension 44 of the shell of the mandrel 45, slightly reduced in diameter, forms a shaft which is journaled in bearings 46 and 47 and to which power is applied for rotation through pulley 48. The end of this shaft projects into a vacuum chest 49 so that a partial vacuum may be established within the mandrel. With this arrangement of parts, we place a control baffle 50 within the mandrel to confine the application of vacuum to a portion of the surface thereof. This baffle is adjustably mounted by means of rod 51 for movement both longitudinally and rotatively within the mandrel. The support for rod 50 shown in detail in Fig. 4 includes a fixed bracket 52 and a rotatable plate 53 concentrically mounted with respect to the mandrel 45 and sleeve 44. Movement of the rod 51 with respect to plate 53 is controlled by set screw 54 while rotation of plate 53 within the bracket 52 is controlled by set screw 55. The extent to which suction is applied about the circumference of the mandrel may be modified by variation in the configuration of the baffle.

As has been stated above, thoroughly satisfactory results have been obtained without evacuation of the mandrel and it is this mode of operation which permits the use of a variety of mandrel designs each particularly adapted for a different function. The hollow rotating shaft of Fig. 1 is satisfactory when a bare copper conductor is being covered but when it is desired to apply consecutive layers of insulation as in the case of cable manufacture, it has been found desirable to provide a central conduit through the mandrel which will not rotate with respect to the cable. Such a structure is shown with various modifications in Figs. 5 to 8. In Fig. 5 the hollow central shaft 56 of this structure is rigidly clamped in a supporting bracket 57. In this design the mandrel is made up in two sections 58 and 59 threaded together at 60. Ball bearing assemblies 61 and 62 carried in these sections of the mandrel permit it to rotate as desired about shaft 56. The heavy hub 63 within which bearing 62 is positioned is grooved to accommodate a V-type belt connected to any suitable prime mover.

Fig. 6 discloses slight variations in the above structure. By providing a connection 65 with a source of supply and a spray head 66, shaft 56 becomes a spraying device. The spray head such as is shown in Fig. 7 combines the functions of guide and spray. A central aperture 67 properly supports and centers the conductor 68 while lateral openings 69 direct a spray of the desired material against the interior of the cone of fibres 70.

The structure disclosed in Fig. 8 constitutes a still further modification of the basic structure of Fig. 5. In this instance no treating materials issue from end of shaft 56 but lateral openings 71 and 72 in the shaft and mandral respectively permit treating fluids in mist or vapor form to reach the fibres deposited on the exterior of the shell. We have found this structure an improvement over the simple spray 18 of Fig. 1 in coating the fibres with tempering and lubricating oils. A relatively slight pressure is sufficient to supply the vapor or mist to the mandrel and force it therefrom. In this case, as in the structures of Figs. 6 and 7, material savings of treating fluids are effected over previous methods since they are applied within a body of fibres and must pass therethrough before they can be dissipated in the surrounding atmosphere.

In Fig. 9 are shown a plurality of devices of this nature arranged in series for the application of successive layers of fibres, one outside the other, as a straight line operation. The type of mandrel which has been used in this instance is the same as that disclosed in Figs. 5 to 8. The illustrated structure consists of fibre forming units designated generally as 73 and 74, mandrels 75 and 76, and suction chests 77 and 78. The mandrels are mounted in substantial axial alignment and are rotated from reversible electric motors 79 and 80 so that they may be rotated in the same or opposite directions. A suitable device for withdrawing the spun fibres is, of course, included in the working assembly but this mechanism has not been illustrated in Fig. 9. As shown in Fig. 9, a conductor is passing through the mandrels and is receiving two coatings of fibres which are being twisted in opposite directions.

In Fig. 10 is shown a compacting device which may advantageously be used in conjunction with the spinning apparatus. This mechanism consists of a rotatable disk 81 mounted in axial alignment with a spinning mandrel 82 and bearing a pair of compacting rollers 83 and 84. These rollers are provided with complementary grooves in their respective faces designed to receive a yarn or cable therein and impart thereto a uniform circular cross section. The brackets 85 and 86 by which those rollers are mounted are adjustably fastened to the face of the disk 81 by means of studs 87 so as to provide for radial movement of the rollers with respect to the axis of rotation of the disk. Rotation of the disk is effected through gearing 88 on the periphery thereof and a pinion 89 driven by a variable speed motor 90. As the yarn or cable advances through the compacting device the radial pressure of the rollers and the circumferential wiping action resulting from rotation of the disk imparts a smooth finish and uniform diameter to the same. In the case of sized yarns and impregnated cables this device aids in incorporating the fluid material throughout the mass of fibres whether such materials be sprayed on externally as from pipes 91 in Fig. 10 or internally as in Figs. 6 and 7.

While this invention has been disclosed primarily with respect to a structure in which fibres are artificially formed and are immediately collected on the spinning mandrel, it has been found that satisfactory results will be obtained when natural fibres are employed and are delivered to the spinning mandrel from the usual carding, picking, and stapling machines commonly employed in fibre preparation in the textile art and various rotating bodies of different configuration may be substituted for the specific mandrel disclosed.

This specific disclosure is by way of illustration and the invention is to be limited only by the scope of the appended claims.

We claim:

1. The method of manufacturing fibrous materials comprising the steps of preparing a quantity of air borne fibres, collecting said fibres about the outer surface of a rotating member to form a body of interlaced fibres, and withdrawing a portion of said fibres in the direction of the axis of rotation of said rotating member.

2. The method of preparing fibrous material which comprises the steps of preparing a quantity of separate fibres, intermingling said fibres and forming them into an interlaced, internally supported mass of annular configuration, rotating said annular mass and continuously applying tractive force to an extremity of said mass to withdraw a body of fibres therefrom.

3. The method of fabricating insulated conductors which comprises building up a felted annular mass of fibrous insulating material about a rotating body, continuously withdrawing an annulus of fibres from one end of said mass, passing a conductor through the center of said rotating body and into the center of said annulus, simultaneously withdrawing said annulus and said conductor at the same linear speed in a direction parallel to the axis of rotation of said aforementioned body and establishing relative rotation between said conductor and said body whereby said annulus is spun down as a seamless twisted coating on said conductor.

4. The method of fabricating an insulated conductor which comprises preparing a felted tubular body of fibrous material, passing a conductor axially through said tubular body and twisting and elongating said body about said conductor thereby forming a tightly spun coating of fibrous insulation thereon.

5. The method of forming an insulated conductor which comprises forming a seamless felted mass of fibrous insulating material about a conductor but spaced therefrom, spinning said mass down into contact with said conductor, and simultaneously spraying an impregnating material between said conductor and said insulating material.

6. The method of forming a yarn which comprises preparing a cylindrical felted mass of fibres, rotating said mass, continuously withdrawing a cone of fibres from one end of said mass in the direction of its axis of rotation, and spraying the interior of said cone with a treating material while it is being withdrawn.

7. The method of forming a yarn which comprises preparing a twisted yarn, passing said yarn through a rotating mass of intermingled fibres and spinning said mass of fibres down onto said yarn to form a seamless layer of interlaced fibres thereon, said spinning being in such a direction as to form a layer of opposite twist to the twist of the core.

8. In combination, means for producing a continuous supply of fibrous material, means adjacent thereto for collecting said fibres in the form of a felted cylindrical mass, said collecting means comprising a rotating cylindrical mandrel and means for creating a region of sub-atmospheric pressure adjacent the surface thereof, and means adjacent said collecting means for withdrawing said fibres axially of said means.

9. In a fibre collecting and spinning mechanism, a rotatable fibre collecting mandrel and a hollow shaft extending substantially through said mandrel and forming a passageway therethrough.

10. In a fibre collecting and spinning mechanism, a rotatable mandrel, said mandrel having a cylindrical body section and a tapered nose section, an opening in the tip of said nose section, and a hollow shaft extending substantially through said mandrel, said opening in the nose section being in register with the end of said shaft, and a spray nozzle on the end of said shaft for spraying fluid substances through said opening.

11. In a wire covering device, means for forming fibres into a cylindrical felted mass, means for drawing off a cone of fibres from one end of said mass, and means positioned within said mass for introducing a conductor into the center of said cone of fibres in a direction axially thereof.

12. In a wire covering device, means for forming fibres of insulating material into a cylindrical felted mass, means for drawing off a cone of fibres from one end of said mass, means positioned within said mass to guide a conductor into the center of said cone of fibres and means adjacent said guide means for spraying fluid substances against the interior of said cone.

13. In a yarn forming device, means for forming textile fibres into a cylindrical, felted mass, means for drawing off a cone of fibres from one end of said mass and twisting them into a yarn and means positioned within said forming means for applying fluid substances to said cylindrical mass of fibres from the interior thereof.

14. In combination, spinning means for depositing a seamless felted coating of insulating fibres about a conductor, spray device adjacent said spinning means to treat said covering after it has been spun about the conductor, and compacting means adjacent said spray and bearing against said conductor to press said fibres together to form a dense body of uniform diameter.

15. In a yarn forming device, means for forming textile fibres into a cylindrical, felted mass, means for drawing off a cone of fibres from one end of said mass and twisting them into a yarn, and spraying means positioned within said forming means to spray fluid substances against the interior of said cone of fibres.

16. The method of fabricating fibrous material which comprises building up a felted annular mass of fibres about the surface of a rotating body, and continuously withdrawing an annulus of fibres from one end of said mass while continuously building up said mass by the application of additional fibres thereto.

17. The method of fabricating fibrous material which comprises building up a felted annular mass of fibres about the surface of a rotating body, continuously withdrawing an annulus of fibres from one end of said mass while continuously building up said mass by the application of additional fibres thereto and maintaining relative rotation between said annular mass and said withdrawn fibres whereby said fibres are spun into a yarn.

18. The method of forming a yarn which comprises preparing a cylindrical felted mass of fibres, rotating said mass, continuously withdrawing a cone of fibres from one end of said mass in the direction of its axis of rotation, spraying the interior of said cone with a treating material while it is being withdrawn and twisting said cone with respect to its apex to spin it down into a yarn.

19. The method of forming a yarn which comprises preparing a twisted yarn, passing said yarn through a rotating mass of intermingled fibres and spinning said mass of fibres down onto said yarn to form a seamless layer of interlaced fibres thereon, said body of fibres being rotated to produce a different twist in said layer from that in said yarn.

20. The method of treating yarn which comprises forming a cone shaped web of interlaced fibres, spinning a tubular yarn from the apex of said cone, and spraying a treating solution against the interior of said cone during the spinning operation.

21. The method of treating yarn which comprises forming a cone shaped web of interlaced fibres, spinning a tubular yarn from the apex of said cone, spraying a treating solution against the interior of said cone during the spinning operation and compressing said yarn to render it compact and of uniform diameter.

22. In combination, means for producing a continuous supply of fibrous material, means adjacent thereto for collecting said fibres in the form of a felted cylindrical mass, said collecting means comprising a rotating cylindrical mandrel and means for creating a region of subatmospheric pressure adjacent the surface thereof, and means adjacent said collecting means for withdrawing said fibres axially of said means, said last named means being adjustable to vary the linear speed of withdrawal of said fibres.

23. In a yarn forming device, a rotatable mandrel comprising a cylindrical body portion and a tapered nose portion, a hollow shaft positioned within said mandrel, and registering openings in the end of said shaft and the tip of said nose providing a passage from the interior of said shaft through said mandrel.

24. The method of manufacturing fibrous materials comprising the steps of preparing a quantity of fine air borne glass fibres, collecting said fibres about the outer surface of a rotating member to form a body of interlaced fibres, and withdrawing a portion of said fibres in the direction of the axis of rotation of said rotating member.

25. The method of preparing fibrous material which comprises the steps of preparing a quantity of separate, long, fine glass fibres, intermingling said fibres and forming them into an interlaced, internally supported mass of annular configuration, rotating said annular mass and continuously applying tractive force to an extremity of said mass to withdraw a body of fibres therefrom.

26. The method of fabricating insulated conductors which comprises building up a felted annular mass of fibrous glass insulating material about a rotating body, continuously withdrawing an annulus of fibres from one end of said mass, passing a conductor through the center of said rotating body and into the center of said annulus, simultaneously withdrawing said annulus and said conductor at the same linear speed in a direction parallel to the axis of rotation of said aforementioned body and establishing relative rotation between said conductor and said body whereby said annulus is spun down as a seamless twisted coating on said conductor.

27. The method of fabricating an insulated conductor which comprises preparing a felted tubular body of fine glass filaments, passing a conductor axially through said tubular body and twisting and elongating said body about said conductor thereby forming a tightly spun coating of fibrous insulation thereon.

28. The method of fabricating fibrous material which comprises building up a felted annular mass of long, fine glass fibres about the surface of a rotating body, and continuously withdrawing an annulus of fibres from one end of said mass while continuously building up said mass by the application of additional fibres thereto.

29. The method of fabricating fibrous material which comprises building up a felted annular mass of long, fine glass fibres about the surface of a rotating body, continuously withdrawing an annulus of fibres from one end of said mass while continuously building up said mass by the application of additional fibres thereto and maintaining relative rotation between said annular mass and said withdrawn fibres whereby said fibres are spun into a yarn.

30. In combination, means for producing a continuous supply of long, fine glass fibres, means adjacent thereto for collecting said fibres in the form of a felted cylindrical mass, said collecting means comprising a rotating cylindrical mandrel and means for creating a region of subatmospheric pressure adjacent the surface thereof, and means adjacent said collecting means for withdrawing said fibres axially of said means, said last named means being adjustable to vary the linear speed of withdrawal of said fibres.

31. In combination, means for producing a continuous supply of long, fine glass fibres, means adjacent thereto for collecting said fibres in the form of a felted cylindrical mass, said collecting means comprising a rotating cylindrical mandrel and means for creating a region of subatmospheric pressure adjacent the surface thereof, and means adjacent said collecting means for withdrawing said fibres axially of said means.

32. The method of fabricating strand material of fibrous glass which comprises attenuating a multiplicity of molten glass streams to form fibres, collecting said fibres immediately after they are formed, layer on layer into an internally supported hollow mass of fibres, gradually moving said mass toward an axial extremity thereof without substantial decrease in diameter, and drawing the fibres of the mass at said axial extremity down into a strand.

33. The method of fabricating strand material of fibrous glass which comprises attenuating a multiplicity of molten glass streams to form fibres, collecting said fibres immediately after they are formed, layer on layer into a rotating mass of substantially annular configuration, gradually moving said rotating annular mass toward an axial extremity thereof, and spinning the fibres of said annular mass as they leave said extremity into a strand of intermingled fibres.

34. The method of fabricating strand material of fibrous glass which comprises attenuating a multiplicity of molten glass streams to form fibres, collecting said fibres directly from the place of formation layer on layer into an internally supported tubular mass of substantially uniform diameter, rotating said mass and gradually moving said mass toward an axial extremity thereof without substantial decrease in diameter, drawing down the mass as it leaves said extremity into a fibrous body of reduced diameter, and maintaining relative rotation between said mass and said body of reduced diameter, whereby said body is spun down into a yarn of intermingled fibres.

35. The method of fabricating glass fibrous strand material, which comprises drawing out a plurality of streams of molten glass into the form of fine fibres, immediately collecting said fibres layer on layer on a rotating support to form an internally supported hollow mass of fibres, moving said mass axially of said support toward an extremity thereof, reducing the diameter of an annulus of fibres at the extremity of said support while simultaneously moving said annulus away from said extremity to continuously form the annular mass into a strand, and continuously building up said mass on said support with additional newly formed fibres.

36. In combination, means for producing a continuous supply of fibrous glass material and means for collecting said fibres in the form of a substantially cylindrical mass, said collecting means comprising a rotatable substantially cylindrical support, and means for moving said cylindrical mass axially of said support and off said support at one end thereof.

37. The method of fabricating insulated conductors which comprises building up an internally supported substantially annular mass of fibrous glass insulating material, continuously moving an annulus of fibres away from one end of said mass, passing a conductor through the center of said annulus in the direction of movement of said annulus, simultaneously moving said annulus and said conductor at the same linear speed in a direction parallel to the axis of rotation of said mass and establishing relative rotation between said mass and said annulus whereby said annulus is spun down as a seamless coating on said conductor.

38. The method of fabricating an insulated conductor which comprises preparing a tubular body of glass fibrous material, passing a conductor axially through said tubular body and elongating said body about said conductor, thereby forming a tightly fitting coating of fibrous insulation thereon.

39. The method of fabricating fibrous material which comprises building up an annular mass of glass fibres about the outer surface of a cylindrical body, and withdrawing an annulus of fibres from one end of said mass and causing the annular mass to follow said annulus and be drawn from said body and lengthened out to form a narrow continuous tubular strand.

40. The method of fabricating fibrous material which comprises superimposing layers of glass fibres about the surface of a rotating body to form an annular mass, and continuously withdrawing an annulus of fibres from one end of said mass while continuously building up said mass by the application of additional fibres thereto.

RALPH C. NEWMAN.
JOHN W. ROMIG.